US008583928B2

(12) United States Patent
Benson et al.

(10) Patent No.: US 8,583,928 B2
(45) Date of Patent: *Nov. 12, 2013

(54) PORTABLE SECURITY TRANSACTION PROTOCOL

(75) Inventors: Glenn Stuart Benson, New York, NY (US); Joseph R. Calaceto, Ridgewood, NJ (US); Russell M. Logar, Breezy Point, NY (US)

(73) Assignee: JP Morgan Chase Bank, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/447,993

(22) Filed: Apr. 16, 2012

(65) Prior Publication Data

US 2012/0260093 A1 Oct. 11, 2012

Related U.S. Application Data

(63) Continuation of application No. 10/882,527, filed on Jul. 1, 2004, now Pat. No. 8,190,893.

(60) Provisional application No. 60/514,760, filed on Oct. 27, 2003.

(51) Int. Cl.
*H04L 9/32* (2006.01)
*G06F 15/16* (2006.01)
*H04L 29/06* (2006.01)
*G06F 21/10* (2013.01)

(52) U.S. Cl.
CPC ............ *H04L 9/3247* (2013.01); *H04L 9/3236* (2013.01); *H04L 63/08* (2013.01); *G06F 21/10* (2013.01); *H04L 63/0853* (2013.01)

USPC ............... 713/170; 713/172; 713/181; 726/2; 726/9; 726/27; 726/28; 726/29; 726/30

(58) Field of Classification Search
USPC .............. 713/168–172, 181; 726/2, 9, 20, 21, 726/27–30
See application file for complete search history.

(56) References Cited

U.S. PATENT DOCUMENTS

| | | | |
|---|---|---|---|
| 5,226,079 A | 7/1993 | Holloway | |
| 5,347,580 A | 9/1994 | Molva et al. | |
| 5,365,589 A | 11/1994 | Gutowitz | |
| 5,491,752 A * | 2/1996 | Kaufman et al. | 380/30 |
| 5,887,131 A * | 3/1999 | Angelo | 726/20 |
| 5,949,882 A * | 9/1999 | Angelo | 713/185 |
| 6,084,969 A * | 7/2000 | Wright et al. | 380/271 |

(Continued)

OTHER PUBLICATIONS

Teppo Halonen: 'Authentication and authorization in mobile environment', Seminar on Network Security, 2000, pp. 1-17.*

(Continued)

*Primary Examiner* — Catherine Thiaw
(74) *Attorney, Agent, or Firm* — Lowenstein Sandler LLP

(57) ABSTRACT

A technique for providing message authenticity includes accepting transaction information, accepting a first data item used for authenticating an originating user, cryptographically processing the transaction information using only a second data item, wherein the entropy of the first data item is less than the entropy of the second data item, and authenticating the originating user using the first data item. The first data item can be a sequence of digits corresponding to those displayed on an external device, such as, for example, an RSA authorization token, credit card, etc.

15 Claims, 7 Drawing Sheets

(56) References Cited

U.S. PATENT DOCUMENTS

| | | | |
|---|---|---|---|
| 6,119,227 A | 9/2000 | Mao | |
| 6,246,767 B1 | 6/2001 | Akins, II et al. | |
| 6,353,888 B1 | 3/2002 | Kakehi et al. | |
| 6,505,302 B1 * | 1/2003 | Matyas et al. | 713/169 |
| 6,516,412 B2 | 2/2003 | Wasilewski et al. | |
| 6,526,508 B2 | 2/2003 | Akins, III et al. | |
| 6,633,980 B1 | 10/2003 | Johnson | |
| 6,807,633 B1 | 10/2004 | Pavlik | |
| 6,915,437 B2 | 7/2005 | Swander et al. | |
| 6,986,046 B1 | 1/2006 | Tuvell et al. | |
| 7,010,689 B1 * | 3/2006 | Matyas et al. | 713/168 |
| 7,024,556 B1 | 4/2006 | Hadjinikitas et al. | |
| 7,069,433 B1 | 6/2006 | Henry et al. | |
| 7,069,438 B2 | 6/2006 | Balabine et al. | |
| 7,114,080 B2 | 9/2006 | Rahman et al. | |
| 7,174,457 B1 | 2/2007 | England et al. | |
| 7,194,618 B1 | 3/2007 | Suominen | |
| 7,213,149 B2 | 5/2007 | Mache | |
| 7,231,517 B1 * | 6/2007 | Mashayekhi | 713/167 |
| 7,231,526 B2 | 6/2007 | Hon et al. | |
| 7,234,059 B1 | 6/2007 | Beaver et al. | |
| 7,249,108 B1 | 7/2007 | Walmsley et al. | |
| 7,281,128 B2 | 10/2007 | Mikel et al. | |
| 7,290,141 B2 | 10/2007 | Sengodan et al. | |
| 7,299,356 B2 | 11/2007 | Mizrah | |
| 7,299,364 B2 | 11/2007 | Noble et al. | |
| 7,318,235 B2 | 1/2008 | Grawrock | |
| 7,363,495 B2 | 4/2008 | Felt et al. | |
| 7,386,720 B2 | 6/2008 | Sandhu | |
| 7,509,495 B2 | 3/2009 | Roig | |
| 7,779,267 B2 | 8/2010 | Chen et al. | |
| 7,783,044 B2 * | 8/2010 | Moreh et al. | 380/278 |
| 7,818,792 B2 | 10/2010 | Shamsaasef et al. | |
| 7,877,799 B2 | 1/2011 | Prouder | |
| 7,900,242 B2 | 3/2011 | Malinen et al. | |
| 2001/0034617 A1 | 10/2001 | Kimata | |
| 2001/0039535 A1 | 11/2001 | Tsiounis | |
| 2002/0007462 A1 | 1/2002 | Omata | |
| 2002/0078353 A1 | 6/2002 | Sandhu et al. | |
| 2002/0087860 A1 | 7/2002 | Kravitz | |
| 2002/0091928 A1 * | 7/2002 | Bouchard et al. | 713/178 |
| 2002/0112157 A1 | 8/2002 | Doyle et al. | |
| 2002/0150253 A1 * | 10/2002 | Brezak et al. | 380/281 |
| 2002/0194473 A1 * | 12/2002 | Pope et al. | 713/168 |
| 2003/0069848 A1 | 4/2003 | Larson et al. | |
| 2003/0105952 A1 | 6/2003 | Brabson et al. | |
| 2003/0149781 A1 | 8/2003 | Yared et al. | |
| 2003/0221126 A1 | 11/2003 | Berman et al. | |
| 2004/0034597 A1 | 2/2004 | Durand | |
| 2004/0059952 A1 | 3/2004 | Newport et al. | |
| 2004/0073790 A1 | 4/2004 | Ateniese et al. | |
| 2004/0117623 A1 | 6/2004 | Kalogridis et al. | |
| 2005/0033960 A1 | 2/2005 | Vialen et al. | |
| 2005/0079869 A1 | 4/2005 | Khalil et al. | |
| 2005/0149729 A1 | 7/2005 | Zmmer et al. | |
| 2006/0218402 A1 | 9/2006 | Kerstens et al. | |

OTHER PUBLICATIONS

R. Molva and G. Tsudik "Autehntication method with impersonal token cards", IEEE, 1993, pp. 56-65.*

Y.K. Kang, D.W. Kim, T.W.Kwon and J. R. Choi "An efficient implementation of hash function processor for IPSEC", ACM, 2000, pp. 1-4.*

* cited by examiner

Value-bearing transaction entry form

| 301 Customer name: | John Smith |
| 302 Origin account: | 437286 |
| 303 Destination acct: | 739292 |
| 304 Transaction amt: | $10,000.00 |
| 305 Value displayed on SecurID token: | 634917 |
| 306 Password | xxxxxxxxxx |

307 Sign | Cancel r, e

PORTABLE SECURITY TRANSACTION PROTOCOL

CROSS REFERENCE TO RELATED APPLICATIONS

This application claims the benefit of U.S. Provisional Application Ser. No. 60/514,760, filed by Glenn Benson et al. on Oct. 27, 2003 and entitled "Methods and Systems For Providing After-The-Fact Transaction Evidence Using Authentication Technology and Message Digests", which is incorporated herein by reference.

FIELD OF THE INVENTION

The present invention relates generally to secure computer communication systems, and, more particularly, to methods and systems for providing end-to-end message authenticity and securing consequential evidence of a transaction.

BACKGROUND OF THE INVENTION

End-to-end message authenticity generally includes three components: message authentication to authenticate an originating user of a transaction, message integrity to ensure that the transaction does not change in-transit, and replay protection to protect against replay attacks. Conventionally, end-to-end message authenticity is addressed through Public Key Infrastructure (PKI) technology, or in some cases symmetric key technology. However, various aspects of the PKI render this technology problematic.

One of the main disadvantages of the PKI is that it requires secure storage of private keys by the originating user. If these keys are simply stored in a computer system, the authentication suffices only to link the equipment with the transaction; the authentication suffices only if one protects the computer system from unauthorized access. This may be unacceptable for many applications due to the difficulty of adequately protecting computer systems. An external device such as a floppy disk or IC card might be used to store the private key, but this has proven to be unwieldy and expensive, especially where widespread dissemination is desired. Moreover, the floppy disk has the property that it can be easily copied, so the owner of the floppy cannot be sure if another person had not previously copied the floppy without notice. An IC card or USB token may incorporate copy protection; however, these devices may require installation of system software, drivers, and sometimes hardware, all of which precipitate user resistance.

SUMMARY OF THE INVENTION

According to the methods and systems of the present invention, a technique for providing message authenticity includes accepting transaction or other information, accepting a first data item used for authenticating an originating user, cryptographically processing the transaction information using only a second data item, wherein the entropy used to construct the first data item is less than the entropy used to construct the second data item, and authenticating the originating user using the first data item.

According to an aspect of the invention, the first data item is obtained from an authentication token. In this case, the first data item can include a sequence of digits corresponding to those displayed on an external device, such as, for example, an RSA authorization token, a credit card, etc. Usually, the first data item would be manually input by a user. Typical values for the number of digits corresponding to the first data item are around 5 to 21. In general, the first data item will be a short alphanumeric string and the second data item will generally be much larger, e.g., a 128 bit sequence to be used principally for data authentication.

According to an aspect of the invention, information obtained from the authentication token contributes to the first data item exclusively.

According to another aspect of the invention, the authentication token is a one-way authentication token.

According to another aspect of the invention, the external device is not electronically connected to a computer system.

According to another aspect of the invention, the first data item is inaccessible to an entity authorized to process the transaction.

According to another aspect of the invention, consequential evidence of the transaction is kept. This evidence can include a message written to a tamper-resistant log record, the message including the transaction information, the first data item, the second item, and an identifier for the originating user, as well as other information. At a subsequent point, the transaction can be shown to have been sent by the originating user and received by the intended recipient, by consulting the log record. Preferably, the validity of the transaction would be ascertained by an independent, mutually trusted third party.

These and other aspects, features and advantages of the present invention will become apparent from the following detailed description of preferred embodiments, which is to be read in connection with the accompanying drawings.

BRIEF DESCRIPTION OF THE DRAWINGS

FIG. 5 illustrates an exemplary screen display of a value-bearing transaction entry form for securely wiring money using the PSTP;

DESCRIPTION OF PREFERRED EMBODIMENTS

Figure 1:
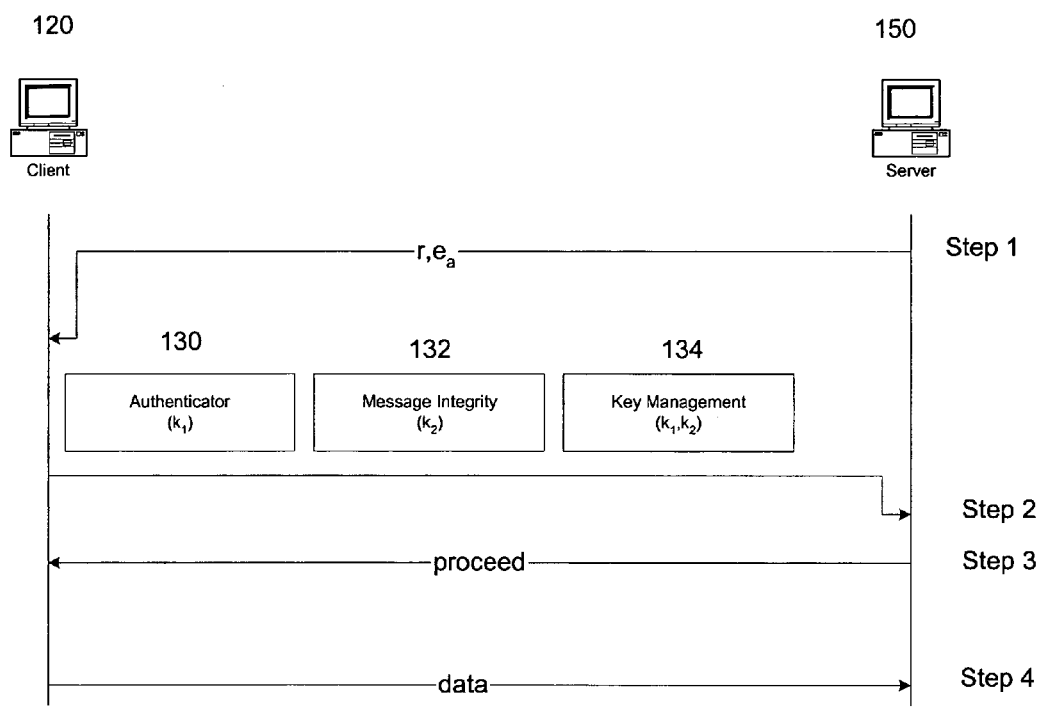
FIG. 1 is a high-level diagram illustrating the Portable Security Transaction Protocol (PSTP)

Throughout the description and drawings various terms and expressions are used with meanings as per the following definitions.

Asymmetric Cryptography: ASYM(e,K) denotes that public keying material, e, encrypts information, K, for the purpose of providing confidentiality. It is assumed that ASYM combines an encoding method with an asymmetric encryption primitive. The resulting encryption scheme must ensure the integrity of the encrypted information. A specific example of asymmetric cryptography with encoding is RSA Encryption Primitive with Optimal Asymmetric Encryption Padding (RSAES-OAEP). This mechanism ensures both confidentiality, and has the property of cypertext indistinguishability which has been shown to be equivalent to non-malleability (See M. Bellare et al., *Relations among Notions of Security for Public-Key Encryption Schemes*, International Association of Cryptologic Research, 1998, which is incorporated herein by reference). In this disclosure, the notation RSAE-SOAEP(e,K) denotes encrypting K with the asymmetric key, e, in accordance with RSAES-OAEP. An example public key is the public key of the application server $e_a$.

Symmetric Cryptography: SYM(k,y) denotes that symmetric key, k, encrypts information, y for the purpose of providing confidentiality. A specific example of symmetric cryptography is Advanced Encryption Standard (AES) in CBC mode using a 128-bit key that was created using 128 bits of key entropy denoted AES(k,y). Other specific example of symmetric cryptography include but are not limited to AES in CBC mode with 192 or 256 bit keys created using 192 or 256 bits of key entropy, respectively; or Triple DES using a 168-bit key.

Message Digest: MD(x) is a deterministic function mapping bit strings of arbitrary length to bit strings of fixed length such that MD is collision-resistant and one-way (non-invertible). A specific example of a message digest algorithm is SHA1 denoted SHA1(x).

Message Integrity: MI(k,z) denotes the keyed message authentication code (message integrity) function, MI, using key, k, applied against data, z. A specific example of a message authentication code function is HMAC, using a 160-bit key which was created with 160 bits of entropy, denoted HMAC(k,z). In this disclosure HMAC denotes the message integrity function specification that uses SHA1 as the underlying message digest algorithm.

Unique nonce: r denotes a unique nonce. r must be completely unique, e.g., unique over time, server reboots, multiple machines, etc. Let || denote the concatenation operation. A specific example of a unique nonce is SHA1(n||t||Server 150DN), where n is a unique number generated through a secure pseudo-random number generator (where the generator has the unguessability property); t is the server's current timestamp, and server DN is the server's unique distinguished name found in the server's certificate 611. In this case, the secure pseudo random number generator has a seed of at least 160 bits created with at least 160 bits of entropy. If the server generates multiple nonces with the same value, t, then each nonce must have a different value, n.

Userid: userid denotes a unique username

Tokenfactor: SIV denotes the Secure Identity Vector which is a value supplied by an authentication token. PSTP uses the SIV as one of the authentication factors. A specific example of a SIV is the current value displayed on an RSA SecurID token. PSTP uses the SIV as one of the authentication factors.

Password: SIP denotes the Secure Identity Password. The purpose of the SIP is to demonstrate that a user knows a secret. PSTP uses the SIP as one of the authentication factors.

Authentication token: An authentication token provides the facility for two-factor authentication (provide something one knows, and something one has). An overview of authentication tokens is presented in: http://www.atstake.com/research/reports/acrobat/rr2001-04.pdf, 22 May 2004.

One-way authentication token: A one-way authentication token is an authentication token that has the following property: A one-way authentication token displays information as output; however, a one-way authentication token does not accept information as input if that information contains or is derived from the information being secured, e.g., signed, HMAC'd. For example, if one wants to obtain the message authenticity property when transmitting the message "1234", then a one-way authentication token would not require the user to input 1-2-3-4, or any other data derived from the value "1234" through a mechanism such as a digest or transformation. An example of a one-way authentication token is an RSA SecurID card because it displays a token code without accepting as input any information pertinent to a transaction. An example authentication token that does not have the one-way property is a PKI-based smart card. A PKI-based smart card may digitally sign data by transforming that data cryptographically. The PKI-based smart card accepts the data as input and provides the transformation as output. Note that the SecurID illustration 400 has digits 0 through 9 near the bottom. This is an optional feature that appears on some SecurID cards that permits the user the ability to enter a password directly into the token. Despite the fact that the user inputs a password, we classify the token as one-way because the user input is independent of the data being secured.

One may employ an authentication token, or a one-way authentication token in the context of a multifactor authentication system. The authentication token provides one component of the authentication credential, while another factor such as a PIN may provide another factor. Typically, a validation module permits authentication only if the authentication module successfully validates all authentication factors.

Message authenticity: An originator resides at one end of a communication link; and a recipient resides at the opposite end. Message authenticity ensures: (i) the recipient authenticates the originator's identity, (ii) the message received by the recipient matches the message transmitted by the sender (the message was not modified in transit), and (iii) replay prevention which ensures that the recipient does not obtain multiple copies of a message that was transmitted only once by the originator.

Entropy: The present invention uses the definition of the term entropy in: Denning, Dorothy, *Cryptography and Data Security*, Reading, Mass.: Addison-Wesley Publishing Co., January, 1983, pp. 17-22.

Pseudo-random number generator and random number generator: Pseudo-random number generators and random number generators are discussed in the following literature: Menezes et al., *Handbook of Applied Cryptography*, Boca Raton: CRC Press, 1997, pp. 169-190.

Unguessable key values (unguessability property): A pseudo-random number generator has the unguessability property if the "sequence of output bits are unpredictable to an adversary with limited computational resources." Menezes et al., supra, at 169-190. A discussion of secure pseudo random number generators is also found therein. The unguessability property holds even in the case that the adversary knows the history of all previous outputs of the pseudo random number generator.

Consequential evidence: Evidence used to ensure that the sender of a message sent the message, or the recipient received the message, and that the message authenticity property was preserved. Such evidence is particularly useful if the sender or recipient were to subsequently deny being associated with the message, because a cryptographic mechanism could be used to determine the veracity of their denial.

Certificate validation: The topics of Public-key certificates and validation of Public-key certificates are discussed in Menezes et al., supra, at 559-561.

Trusted Party: A Trusted Party is an entity which is trusted by all participants and independent judges to operate in accordance to its specification. Examples of Trusted Parties include Certificate Authorities and Trusted Timestamp Authorities.

CVV: The Credit Card Validation code (CVV) is typically a three or four digit number printed on some credit cards. The intention of the CVV is to demonstrate physical possession of the credit card because the CVV is not embossed on the card and hence not printed on receipts. This makes it difficult for anyone other than the genuine cardholder to know the CVV. Some card issuers refer to this number as the Card Security Code, Personal Security Code, or Card Verification Value.

SSL: SSL refers to the Secure Socket Layer v3 protocol. While this document references SSL, one may substitute TLS version 1.0 for any reference to SSL. One of the options for operating either SSL or TLS is bidirectional authentication. In this case, the two peers of the SSL protocol authenticate each other through demonstrations that involve asymmetric cryptographic methods. That is, each peer demonstrates access to their respective private keying material, and the other peer validates the demonstration using the corresponding public keying material. TLS reference: Dierks, T., et. al., Network Working Group RFC 2246, the TLS Version 1.0, January, 1999.

FIG. 1 is a high-level diagram summarizing the Portable Security Transaction Protocol (PSTP). The PSTP's endpoints are a Client 120 that initiates a transaction and a Server 150 that authenticates and then executes the transaction.

In Step 1, the Client 120 downloads from the Server 150 two items: a server-generated unique nonce, r, and the Server's 150 certificate, which contains the Server's 150 public key, $e_a$. The Client 120 validates the Server's 150 certificate and extracts the public key for subsequent use. It is to be appreciated that the Client 120 will have already obtained through out-of-band means the certificate's distinguished name and root certificate required for validation. It is to be further appreciated that identical notation for the Server's 150 public key and certificate are herein adopted, but one may readily determine the notation's meaning from context.

Next, in Step 2, the central cryptographic aspect of the protocol takes place. The Client 120 transmits a single message that contains three components. The Authenticator component 130 contains material that uniquely authenticates the user associated with the Client 120. The Message Integrity component 132 is a cryptographic seal that protects data against unauthorized modification. The Key Management component 134 securely transports symmetric keys, $k_1$ and $k_2$, encrypted with the Server 150's public key. The Authenticator component 130 and Message Integrity component 132 use these keys, respectively.

Next, in Step 3, an optional signaling takes place. The Client 120 may ignore this signal and proceed to the next step immediately.

Lastly, in Step 4, the Client 120 transmits data to the Server 150. The Server 150 cross-references this data into the Message Integrity component 132. If the cryptographic seal communicated in the Message Integrity component 132 does not correspond to the data transmitted in Step 4, then the protocol raises an exception. If Step 4 is executed without an exception, then the Server 150 executes the transaction.

Figure 2:
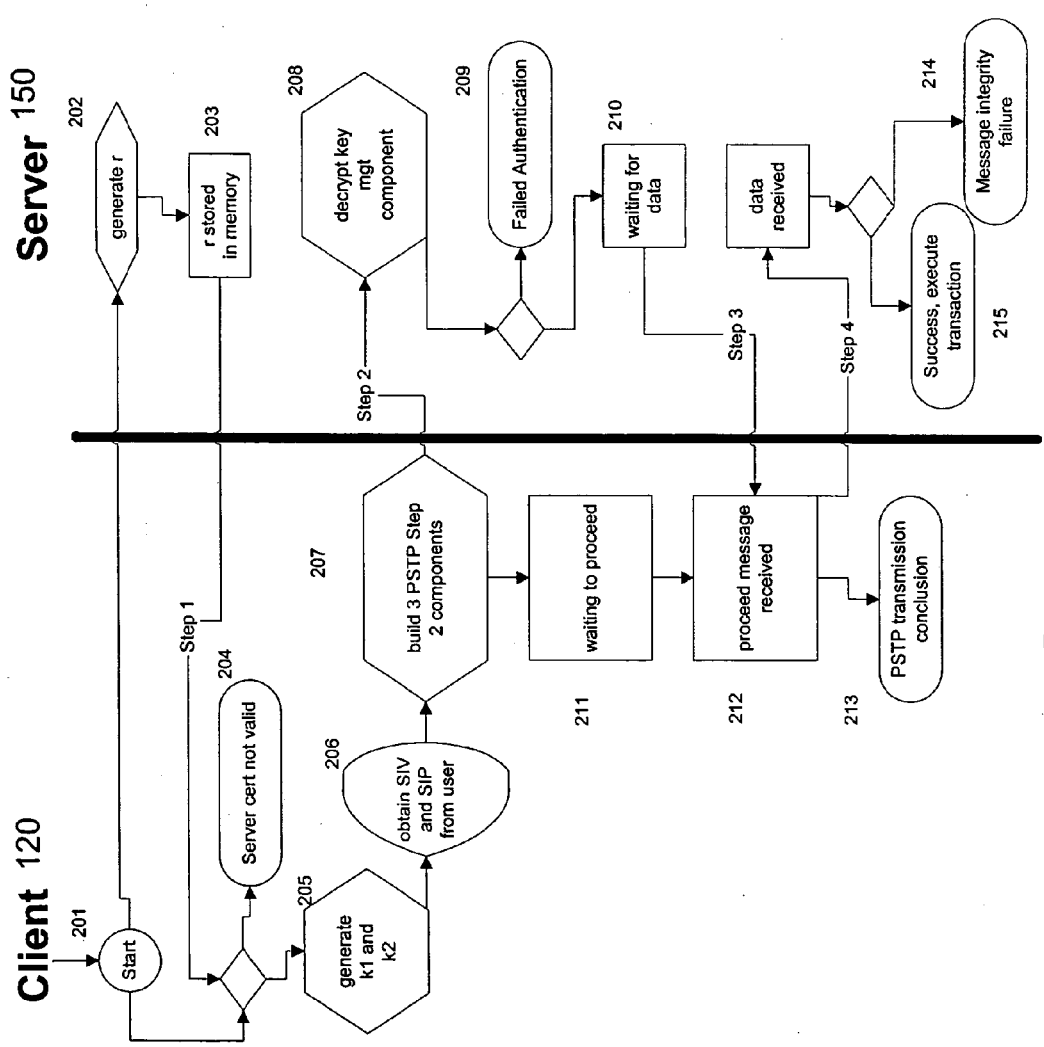
FIG. 2 is an exemplary activity diagram for the PSTP.

To better appreciate the protocol described above, an activity diagram is provided in FIG. 2. In general, an activity diagram shows activities and events that cause an object to be in a particular state.

Step 1

The Client 120 begins by sending an initiation request to the Server 150 (201). The Server 150 prepares for the first message by generating a unique number, r (202). The value r need not be a random value; however, the Server 150 must ensure r's uniqueness. In this present example, r has the properties of production by a pseudo-random number generator and unguessability. The Server 150 could create r from the current timestamp and additional entropy information. The Server 150 stores r in volatile memory, and subsequently references r as a countermeasure against playback attacks (203). If the Server 150 wishes to cancel any transaction before completion, then the Server 150 must delete r (or any unique nonce or timestamp used to create r) from its volatile memory. The Server 150 downloads the first message including r and the server's certificate containing $e_a$ to the Client 120. The Client 120 then validates the Server's 150 certificate and extracts $e_a$. If the Server's 150 certificate is not valid, then the Client 120 terminates the protocol in the state labeled "Server cert not valid" (204). The Server 150 stores the nonce, r, in its volatile memory.

Step 2

The Client 120 then generates two unguessable key values $k_1$ and $k_2$ (205). In order to produce these values, the Client 120 confidentially seeds a pseudo-random number generator with 160 bits of entropy, and then executes the pseudo random number generator to produce any required random values, e.g., $k_1$ and $k_2$, any initial vector required for symmetric cryptography, and any randomness required by RSA OAEP. Then, the Client 120 prompts the user for the two-factors of the authentication material: SIV and SIP (206). The Client 120 uses $k_1$ as a key for the authenticator; and the Client 120 uses $k_2$ as the key for the Message Integrity component (207). The Client 120 encrypts $k_1$ and $k_2$ into the Key Management component 134 (207).

Figure 3:
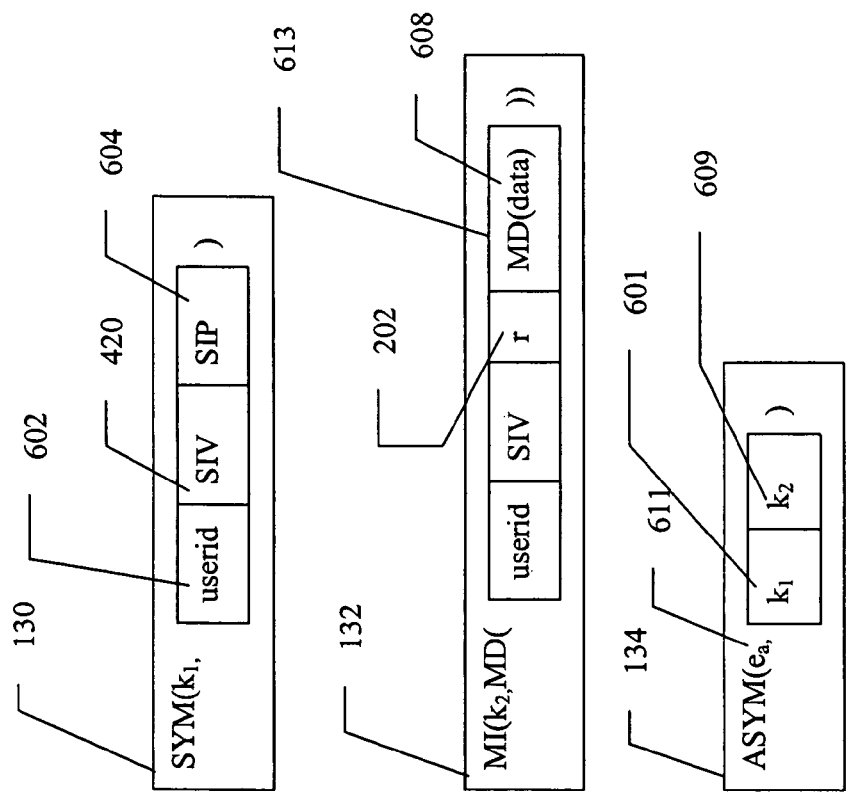
FIG. 3 illustrates an exemplary message layout.

Upon receipt, the Server 150 uses its private keying material to decrypt the Key Management component 134 yielding $k_1$ and $k_2$ (208). The Server 150 applies $k_1$ to the symmetric algorithm to decrypt the authenticator, and then perform the authentication. The authentication step uses the information extracted from the Authenticator component 130 to query a server which knows how to validate authentication requests. In the case of the SecurID token, the server is RSA Security's ACE server. If user authentication fails, then the Server 150 terminates PSTP in the state labeled "Failed Authentication" (209), and cancels the transaction. The Server 150 holds the Message Integrity Component 132 including $k_2$ for subsequent validation (210). Referring to FIG. 3, the Step 2 message transmitted from the Client 120 to the Server 150 has the following specification:

Authenticator 130: $SYM(k_1,(userid\|SIV\|SIP))$
Message Integrity 132: $MI(k_2,MD(userid\|SIV\|r\|MD(data)))$
Key Management 134: $ASYM(e_a,(k_1\|k_2))$ The Server 150 uses the private keying material associated with $e_a$ 611 to decrypt the Key Management component 134 yielding $k_1$ 601 and $k_2$ 609. The Server 150 uses the $k_1$ 601 to decrypt the Authenticator Component 130. Using userid 602, SIV 420, and SIP 604, the Server 150 authenticates the user and cancels the transaction if the authentication fails.

If the Server 150 detects any errors, then the Server 150 discards the nonce 202 from its volatile memory in order to protect against reuse. Note that data 608 is the message which PSTP secures, i.e., PSTP ensures that data 608 gets the properties of message authenticity and stores the associated consequential evidence.

Step 3

If the Server 150 correctly authenticates the Client 120, then the Server 150 sends an optional message to the Client 120 signaling that the Client 120 may proceed (211, 212).

Step 4

The Client 120 then uploads the data 608. At this point the Client 120 concludes its PSTP processing in the state labeled "PSTP transmission conclusion" (213). Upon the Server's 150 receipt, the Server 150 validates the Message Integrity component 132 by revalidating the HMAC using the userid 602, the SIV 420, the r 202, and the data 608. The validation relies upon the Server 150 to input (the message digest of the data 608) 613 into the HMAC computation. Additionally, if r 202 contains an embedded timestamp, then the Server 150 should optionally validate that the timestamp is not too old, e.g., over 10 minutes old. If the HMAC or timestamp validation fails, then the Server 150 terminates PSTP in the failed state labeled, "Message integrity failure" (214) and cancels the transaction. If the validation succeeds, then the Server 150 terminates the protocol in the state labeled "Success, execute transaction." (215) In this case, the Server 150 may execute the transaction authorized by the Client 120, i.e., use the information called data 608 above. Regardless of the outcome of the validation, the Server 150 discards all of PSTP's temporary information from volatile memory in order to protect against the reuse of the nonce or other temporary information. Any notification to the Client 120 that the transaction failed, is communicated from the Server 150 through out-of-band means.

The following example provides further details of the four steps described above. This further detail augments the description of the four steps by specifying exemplary algorithms and other pertinent information which instantiate the abstract specification described above.

Step 1: The client downloads r=SHA1(n,t,serverDN) (202), and $e_a$ 611 from the Server 150, where n is a the result of a pseudo-random number generator seeded with 160 bits of entropy, t is the current timestamp in milliseconds, and serverDN is the server's distinguished name. The server stores n, t, and serverDN in volatile memory, and can regenerate r upon request. However, if in one of the subsequent steps of the protocol, the server were to detect an error, then the server would discard n and t from volatile memory, thus prohibiting any practical possibility of regenerating r.

Step 2: The client uploads the following message to the server
AES($k_1$,(userid||SIV||SIP)) 130,
HMAC($k_2$,SHA1(userid||SIV||r||SHA1(data))) 132,
RSAESOAEP ($e_a$,($k_1$,$k_2$)) 134
where SIV 420 is the current value displayed on the user's RSA SecurID token 400, and SIP 604 is the corresponding password.

Step 3: The Client 120 downloads a message from the Server 150 indicating that the client may proceed. In the case of HTTP interaction, the client sends the Step 2 message in an HTTP POST which requests the next URL. The client downloads this URL from the server, and this download acts as the proceed message.

Step 4: In Step 4, the Client 120 uploads the data 608. The Server 150 uses the data and the values stored in memory to validate the HMAC result. Additionally, the Server 150 fails validation if the difference between the current time, and the value t is larger than a predefined threshold. The Server 150 responds with a PSTP transaction success message if and only if the validation succeeds.

Figure 4:
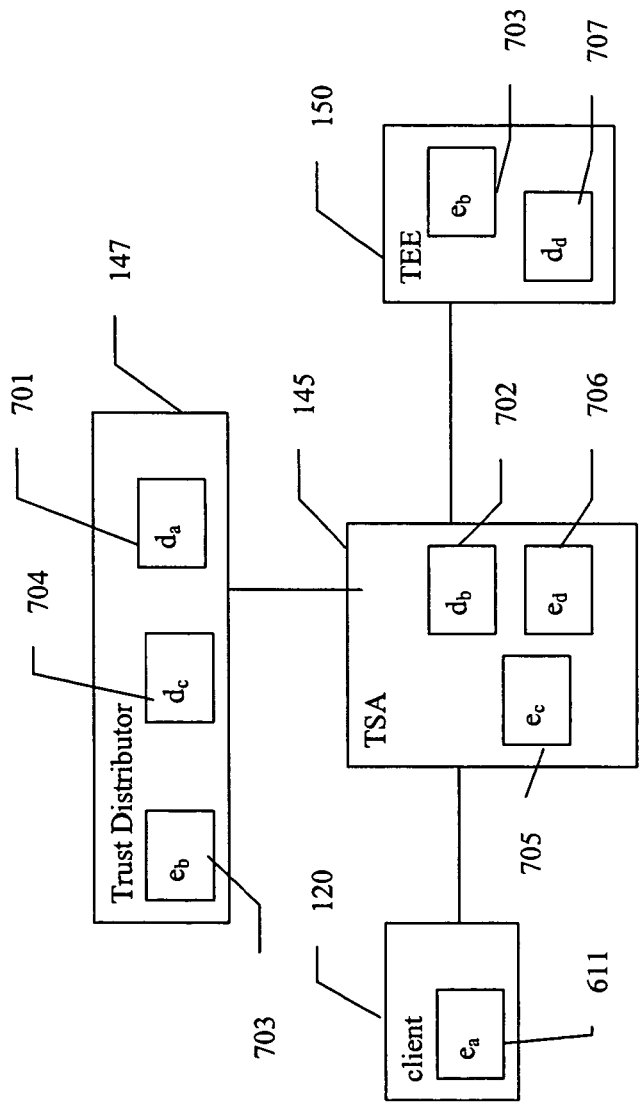
FIG. 4 illustrates an exemplary architecture for providing consequential evidence of a transaction using the PSTP.

Referring to FIG. 4, an exemplary architecture for providing consequential evidence of a transaction is illustrated. FIG. 4 includes the Client 120, a Transaction Security Authority TSA 145, a Transaction Execution Engine TEE 150, and a Trust Distributor 147. The Client 120 is communicatively coupled to the TSA 145. The TSA is communicatively coupled to the TD 147 and the TEE 150 (an embodiment of the Server 150).

Asymmetric key pair ($e_a$,$d_a$) where $d_a$ 701 is the private keying material which decrypts information that was encrypted with $e_a$ 611. The private keying material $d_a$ 701 resides on the Trust Distributor 147. A collection of asymmetric key pairs, where each key pair is used to authenticate a bidirectionally authenticated SSL link. The TSA 145 and the Trust Distributor 147 conduct all communication over an SSL link where the two parties mutually authenticate under the auspices of the SSL protocol using $d_b$ 702 and $d_c$ 704, respectively; and they validate the peers' authentication using $e_c$ 705 and $e_b$ 703, respectively. The TSA 145 and the TEE 150 conduct all communication over an SSL link where the two parties mutually authenticate under the auspices of the SSL protocol using $d_b$ 702 and $d_d$ 707, respectively; and they validate the peers' authentication using $e_d$ 706 and $e_b$ 703, respectively.

The TSA 145 and the TEE 150 create their bidirectionally authenticated SSL link at system initialization time (before processing any PSTP signatures). Each respective machine implicitly trusts that any information received over the SSL link was transmitted by the peer of the SSL link. For example, if a message claims to originate from the TSA 145, then the TEE 150 allows the message if it arrived over the SSL link from the TSA 145; and discards the message if it did not arrive from the SSL link from the TSA 145.

The private keying material of each asymmetric key pair is held confidentially by each machine and is not shared with other parties. The private keying materials are: $d_a$ 701, $d_b$ 702, $d_c$ 704, and $d_d$ 707.

The TEE 150 operates upon the data 608. For example, if the data 608 is instructions to move funds, then the TEE 150 contains the business logic to execute a funds transfer transaction.

The Trust Distributor 147 includes, but is not limited to, all functionality of the RSA ACE Server (the server that validates RSA SecurIDs). In this case, the ACE server authenticates by interrogating the userid 602, SIV 420, and SIP 604. The ACE server returns a Boolean result: success if and only if the userid 602, SIV 420, and SIP 604 are currently valid in accordance to RSA SecurID semantics. The operators of the Trust Distributor 147 (ACE server) apply best practices in their operational duties.

The following scenario provides further details of the four PSTP steps.

Step 1: The client 120 downloads r=SHA1(n,t,serverDN) (202), and $e_a$ 611 from the TSA 145, where n is a the result of a pseudo-random number generator seeded with 160 bits of entropy, t is the current timestamp in milliseconds, and serverDN is the server's distinguished name. The TSA 145 stores n, t, and serverDN in volatile memory, and can regenerate r upon request.

Step 2: The Client 120 uploads the following message to the TSA 145:
AES($k_1$,(userid||SIV||SIP)) 130,
HMAC($k_2$,SHA1(userid||SIV||r||SHA1(data))) 132,
RSAESOAEP ($e_a$,($k_1$,$k_2$)) 134.
The SIV 420 is the current value displayed on the user's RSA SecurID token 400, and the SIP 604 is the corresponding password. The Client 120 saves a copy of the message in its non-volatile storage to be used for the client's record keeping.

Step 2a: The TSA 145 creates a value called "TS". The TSA assigns the value TS with the current date and timestamp, and keeps TS in its internal memory.

Step 2b: The TSA 145 forwards the information that it just received from the Client 120 to the Trust Distributor 147. The Trust Distributor 147 uses $d_a$ 701 to decrypt the Key Management Component 134, thereby discovering $k_1$ 601 and $k_2$ 609. The Trust Distributor uses $k_1$ 601 to decrypt the Authenticator component 130, and then validates information in the Authenticator component 130 using ACE server functionality. If the validation fails, then the Trust Distributor 147 returns a failure message to the TSA 145. Otherwise, the Trust Distributor 147 returns a success code coupled with the decrypted Message Integrity key $k_2$ 609. Upon receipt, the TSA 145 stores $k_2$ 609 in memory.

Step 3: The Client 120 downloads a message from the TSA 145 indicating that the Client 120 may proceed. In the case of HTTP interaction, the Client 120 would send the Step 2 message in an HTTP POST which requests the next URL. The Client 120 downloads this URL from the TSA 145, and this download acts as the proceed message.

Step 4: The Client 120 uploads the data 608. The Client 120 preferably saves a copy of the data 608 in its non-volatile storage to be used for the client's record keeping. The TSA 145 uses the data 608 and the values stored in memory to validate the HMAC result of the Message Integrity component 132. The TSA 145 responds with a PSTP transaction success if and only if validation succeeds.

Step 4a: The TSA 145 creates a log record which includes the following:

AES($k_1$,(userid∥SIV∥SIP)) 130,
HMAC($k_2$,SHA1(userid∥SIV∥r∥SHA1(data))) 132,
RSAESOAEP ($e_a$,($k_1$,$k_2$)) 134,
data 608,
TS, r.

Step 4b: The TSA 145 writes the log record to a tamper-evident log. An example of a tamper-evident logging is found in the following literature: B. Schneier and J. Kelsey, *Cryptographic Support for Secure Logs on Untrusted Machines*, The 7th USENIX Security Symposium Proceedings, pp. 53-62, USENIX Press, January 1998, which is incorporated by reference herein in its entirety.

Step 4c: The TSA 145 sends a copy of the log record to the TEE 150, and then discards all information pertaining to this PSTP session stored in memory, e.g., n, t, r and TS.

Step 4d: The TEE 150 extracts the data 608 from the log record and acts upon the data. For example, if the data 608 includes instructions to move funds, then the TEE 150 performs the actual funds movement.

At a subsequent point in time, suppose a user questions the validity of the PSTP signed data 608. In this case, the TSA 145 may respond to this question by confidentially presenting the following material to an independent, mutually trusted 3$^{rd}$ party judge:

the log record of the questioned message
Information required to demonstrate that the tamper-evident log has not been tampered
Information which demonstrates that the log record in question appears in the log
$d_a$ 701
SecurID seed 801
serial number 802

With one exception, this same judge repeats all validations of Step 2b and Step 4. In addition, this same judge validates that the tamper-evident log has not been tampered. The one exception is that this same judge validates the authentication component using TS from the log record, as opposed to using the current date and time. This validation requires a special tool that is similar to the ACE server.

If the TEE 150 executes a transaction, then at a later time, the Client 120 may demand that the TSA 145 produce the corresponding log record; and then the parties may use the 3$^{rd}$ party judge for independent validation. Otherwise, the Client 120 may deny the transaction.

Advantageously, the mechanism described herein allows any, or all, of the Client 120, the TSA 145, the TEE 150, the Trust Distributor 147, and the 3$^{rd}$ party judge to be operated by different parties. In the case of a SecurID credential, the consequential evidence in the log record provides a valid record of an historical event. Collusion between multiple of the above parties would be required in order to obtain log record entries that may be incorrect. For example, the party that executes transactions, the TEE 150, never discovers information contained in the Authenticator component 130; and the TEE 150 does not maintain the tamper-evident log.

The TSA 145 which is the party that validates the Message Integrity component 132 and maintains the tamper-evident log, never discovers information in the Authenticator component 130. The Trusted Distributor 147 which is the party that validates the Authenticator component 130 never obtains the data 608 and does not maintain the tamper-evident log.

One factor that contributes to the overall strength of PSTP security is the relative strength of security of the authentication credential. For example, a SecurID credential provides better authentication than a credit card because it is easier to make an illicit copy of a credit card number than it would be to compromise SecurID security by building a copy of the authentication token. Nevertheless, in some cases, the lower security afforded by a credit card number may provide sufficient security to authenticate the client. The determination of whether or not a credit card number provides sufficient security is a business decision. In this case, one may use a CVV number wherever PSTP requires a SIP; and one may use a credit card number wherever PSTP requires a SIV. A CVV number is an anti-fraud security feature found on many credit cards that is used to verify that the cardholder is in possession of the card. Note that neither the TSA 145 nor the TEE 150 discover the value of the SIV or SIP. In the case of credit card numbers, this property may be important because it allows vendors to securely sell merchandise on a public network such as the Internet, provide a secure historical record of consequential evidence of all transactions, issue receipts for transactions (the copy of the PSTP signature held by the client); yet never discover the value of the credit card number or CVV. That is, the value of the credit card number and CVV would only be known by the Client 120 and the Trust Distributor 147. In this case, the entity selling merchandise may operate the TSA 145 and the TEE 150. Alternatively, for added security, the entity selling the merchandise may operate the TEE 150, and communicate with an independent entity who operates the Trust Distributor 147.

Based on the forgoing, it can be concluded that the Trusted Parties demonstrate (1) they had sufficient evidence to ensure message authenticity at the time of the event, (2) they logged the event correctly at the time of the event, and (3) the log has not been tampered after the event.

The invention will be further clarified by the following user case:

Example

FIG. 5 illustrates an exemplary screen display 300 of a value-bearing transaction entry form. The screen display 300 includes a customer name box 301 for entering a user's name, an origin account box 302 for entering an originating party's account number, a destination account box 303 for entering a destination party's account number, a transaction amount box 304 for entering an amount to transfer to the destination account, a token box 305 for entering an authorization token, a password box 306 for entering a password, and a signature button 307 for digitally signing the transaction. It is to be appreciated that the screen display 300 shown in FIG. 3 is a simplified version of an actual form and is provided for illustrative purposes. Furthermore, it is to be appreciated that various other graphical user interface widgets could be used to implement this screen 300.

In operation, a user points his or her browser towards a Web-based financial application. The Web-based application then presents a logon prompt. Thereupon, the user logs into the system by presenting his or her authentication credentials. The user then executes facilities presented by the Web-based financial application. Eventually, the user indicates that he or she wants to perform a function that requires added security.

For example, the user might decide to wire $10,000 from account 437286 to account 739292.

Figure 6:
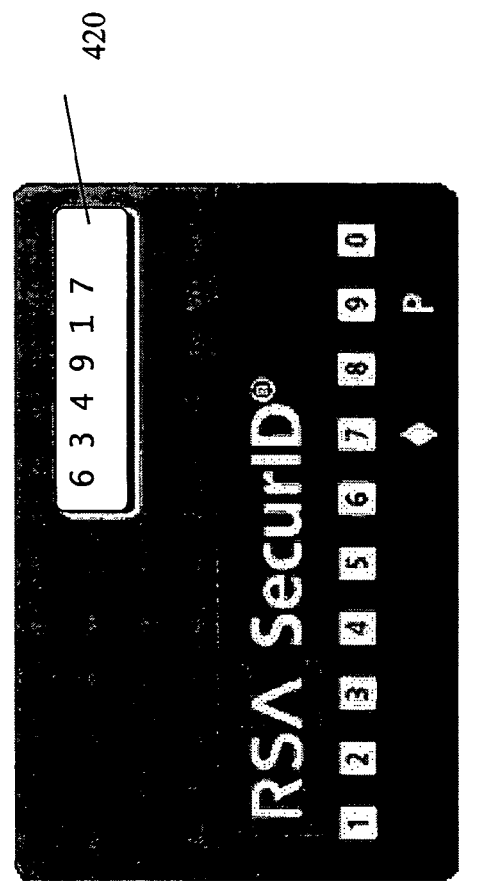
FIG. 6 illustrates a RSA SecurID token useable to generate a unique number.

In this case, the user would enter the customer's name (e.g., "John Smith") in the customer name box 301, origin account number (e.g., "437286") in the origin account box 302, destination account number 739292 in the destination account box 303, transaction amount 10000 in the transaction amount box 304, current token code (634917) 420 into the token box 305, and password in the password box 306. The user would obtain the current token code 420, for example using a SecurID card 400 (commercially available from RSA Security, Inc.), as shown in FIG. 6. As depicted in FIG. 6, the SecurID token code 420 is displayed to the user. As is well known in the art, the SecurID card 400 continually generates a series of one-time authentication token codes 420 that can be used to access a server. Heretofore, the SecurID card 400 worked in conjunction with a server to authenticate a user to a network. However, rather than use the SecurID card 400 solely for purposes of network authentication, the SecurID card 400 may be used to establish user authenticity for a transaction.

To accomplish the transaction the user clicks on the sign button 307 with a mouse device. The user's Web browser combines the information that the user entered into the form with the values r and $e_a$, previously generated by the server and downloaded to the user's web browser along with the form. The browser cryptographically processes the result and uploads that cryptographic result to the server (Step 2). The server replies to the user's browser (Step 3). This step is hidden from the user. The browser uploads the information in the form to the server (Step 4). The server downloads a page to the user indicating whether or not the transaction succeeded.

A user may repeat the process described above multiple times. Each time the user securely transmits a new message and obtains the benefit of message authenticity. On each message the user reuses the same authentication device, e.g., SecurID token 400. However, the token code 420 displayed on the SecurID token would be different for each message.

This example has the following properties:

SIV: 6 numeric digits

SIP: length not specified, but advised to be at least 7 characters $k_1$: 128 bits of key entropy (examples of 192 or 256 bits also provided)

$k_2$: 160 bits of key entropy

In the example, the originator's client must contribute at least 160 bits of key entropy toward the creation of $k_2$. However, the originator's user only needs to copy 6 characters of information from the Authentication token 420 into the box 305.

This invention uses technologies and concepts that are known to those skilled in the cryptographic art, including:

SHA1: ANSI X.9.30:2-1997, *Public-key Cryptography for the Financial Services Industry*: Part 2: The Secure Hash Algorithm (SHA-1) (revision of X9.30:2-1993).

HMAC: ANSI X9.71-2000, Keyed Hash Message Authentication Code (MAC).

3DES: ANSI X9.52-1998, Cryptography for the Financial Services Industry: Triple Data Encryption Algorithm Modes of Operation AES: *Federal Information Processing* Standards Publication 197, 26-NOV-01, Advanced Encryption Standard (AES). AES supports key sizes of 128 bits, 192 bits, and 256 bits.

Public Key Infrastructure (PKI): Menezes et al., *Handbook of Applied Cryptography*, Boca Raton: CRC Press, 1997, pp.

Distinguished Name: RFC 1779, Kille, S., "A String Representation of Distinguished Names", March 1995.

RSA OAEP: RSA Laboratories. PKCS #1 v.2.1: RSA Cryptography Standard. June 2002.

Figure 7:
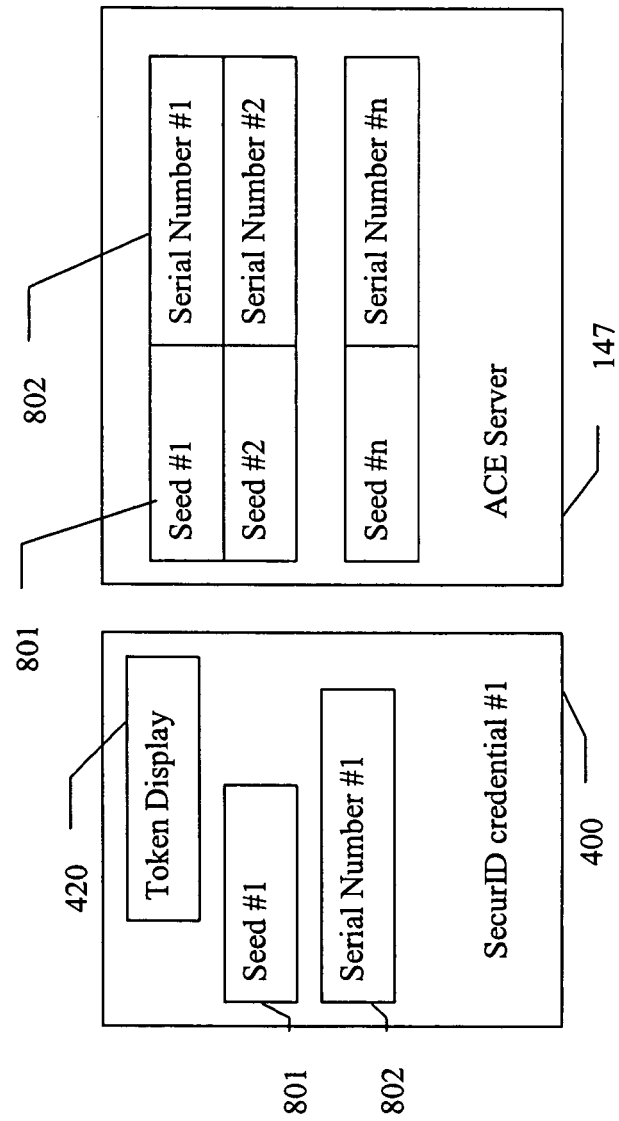
FIG. 7 illustrates the architecture of a RSA SecurID token.

RSA Security SecurID card: "RSA SecurID authenticators (also called tokens) allow users to identify themselves to the network and thus gain access to protected resources. Referring to FIG. 7, starting with a random but user-specific seed value 801, the token generates and displays a unique number every time period, e.g., 60 seconds, (SIV 420). The generated number is valid only for that user and that time period—and only when combined with the user's secret PIN or password (SIP 604). Because of the dynamic nature of the token, a user's electronic identity cannot be easily mimicked, hacked, or hijacked". RSA Security: http://www.rsasecurity.com/products/securid/brochures/SID_BR_1202_lowres.pdf, 22 May 2004. The seed 801 is hidden within the SecurID token's 400 memory and security measures prevent its discovery. The serial number 802 is printed on the SecurID token 400, and can be read by anyone in physical possession of the token. The Trust Distributor 147 which may serve in the capacity of an RSA ACE Server has a copy of the unique seed and serial number of each credential. For simplicity, this disclosure assumes that the userid and the serial number are the same. However, in some cases, these values are different and a table exists which defines a one-to-one mapping between them. In other words, when presented with a userid, the table immediately yields the corresponding serial number. This table may potentially be implemented on the Server 150, or the Trust Distributor 147.

This present invention assumes that a tool exists which operates in a similar manner to the ACE server; however, it allows an historical time to be provided as an input, in addition to the SIV, userid, and possibly the serial number. This tool is used by a $3^{rd}$ party judge to independently validate consequential evidence of historical events. Unlike the ACE Server, this tool does not guarantee one-time semantics for the SIV, e.g., the tool can validate the same SIV multiple times. Also, the tool does not require the SIV.

The SecurID mechanism is one possible authentication mechanism for use in conjunction with the present invention. Another example is the credit card number (perhaps along with the CVV number). In this case, the $3^{rd}$ party judge must determine validity of a credit card number at the time of historical transaction. The validation performed by the $3^{rd}$ party judge includes, but is not limited to, validation of the start and end validity of the credit card number against the date of the transaction. In addition, the check should validate an historical record of credit card number suspension to determine if the credit card was cancelled by the user or any other authorized party before the date of the transaction.

To facilitate a clear understanding of the present invention, illustrative examples are provided herein which describe certain aspects of the invention. However, it is to be appreciated that these illustrations are not meant to limit the scope of the invention, and are provided herein to illustrate certain concepts associated with the invention. For example, while the user case example shown herein is described with respect to the financial services industry, it is to be understood that the methods and systems of the present invention may also be suitable in other industries. In general, the present invention may be thought of an alternative to PKI-based digital signature.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-implemented method, comprising:
   transmitting, using a programmed computer, an initiation request to a recipient;
   generating, at the programmed computer, a message integrity component, wherein the message integrity component comprises a message integrity key, and wherein the message integrity component protects data against unauthorized modification;
   generating, at the programmed computer, a user authentication component, wherein the user authentication component comprises a user authentication key for uniquely authenticating the recipient, and wherein the user authentication key is displayed on an external device;
   encrypting, at the programmed computer, the message integrity key and the user authentication key into a key management component, wherein the entropy of the user authentication key is less than the entropy of the message integrity key, and wherein the key management component is transmitted to the recipient to securely transport the message integrity key and the user authentication key; and
   uploading, using the programmed computer, transaction data to the recipient for validation, wherein validation comprises cross-referencing the uploaded transaction data with the message integrity component.

2. The method of claim 1, wherein the message integrity component further comprises a unique nonce.

3. The method of claim 1, wherein the message integrity key is not derivable from the user authentication key.

4. The method of claim 1, wherein the external device is an authentication token.

5. The method of claim 4, wherein information obtained from the authentication token contributes to the user authentication key exclusively.

6. The method of claim 4, wherein the authentication token is a one-way authentication token.

7. The method of claim 1, wherein the user authentication key includes one or more of a sequence of digits corresponding to those displayed on the external device.

8. The method of claim 7, wherein the external device is not electronically connected to a computer system.

9. The method of claim 7, wherein the number of digits of the sequence of digits is less than ten.

10. The method of claim 9, wherein the entropy of the message integrity key is 80 bits or greater.

11. The method of claim 7, wherein the number of digits of the sequence of digits is less than twenty-one.

12. The method of claim 11, wherein the entropy of the message integrity key is 80 bits or greater.

13. The method of claim 1, wherein the user authentication key is inaccessible to an entity authorized to process a transaction related to the message.

14. A computer system, comprising:
   a computer-readable memory; and
   a processor communicatively coupled to the computer-readable memory, the processor programmed to:
   transmit an initiation request to a recipient;
   generate a message integrity component, wherein the message integrity component comprises a message integrity key, and wherein the message integrity component protects data against unauthorized modification;
   generate a user authentication component, wherein the user authentication component comprises a user authentication key for uniquely authenticating the recipient, and wherein the user authentication key is displayed on an external device;
   encrypt the message integrity key and the user authentication key into a key management component, wherein the entropy of the user authentication key is less than the entropy of the message integrity key, and
   wherein the key management component is transmitted to the recipient to securely transport transports the message integrity key and the user authentication key; and
   upload transaction data to the recipient for validation, wherein validation comprises cross-referencing the uploaded transaction data with the message integrity component.

15. A non-transitory computer-readable storage medium carrying one or more sequences of instructions for implementing a method, wherein execution of the one or more sequences of instructions by one or more computers causes the one or more computers to perform the steps of:
   transmitting an initiation request to a recipient;
   generating a message integrity component, wherein the message integrity component comprises a message integrity key, and wherein the message integrity component protects data against unauthorized modification;
   generating a user authentication component, wherein the user authentication component comprises a user authentication key for uniquely authenticating the recipient, and wherein the user authentication key is displayed on an external device;
   encrypting the message integrity key and the user authentication key into a key management component, wherein the entropy of the user authentication key is less than the entropy of the message integrity key, and wherein the key management component is transmitted to the recipient to securely transport the message integrity key and the user authentication key; and
   uploading transaction data to the recipient for validation, wherein validation comprises cross-referencing the uploaded transaction data with the message integrity component.

* * * * *